United States Patent [19]

Haba

[11] Patent Number: 5,307,219
[45] Date of Patent: Apr. 26, 1994

[54] TAPE LOADING DEVICE
[75] Inventor: Yoshiaki Haba, Kanagawa, Japan
[73] Assignee: Sony Corporation, Tokyo, Japan
[21] Appl. No.: 898,695
[22] Filed: Jun. 15, 1992
[30] Foreign Application Priority Data Jun. 19, 1991 [JP] Japan .................. 3-147028

[51] Int. Cl.$^5$ ............................................. G11B 15/00
[52] U.S. Cl. ........................................ 360/85; 226/196; 226/199; 242/76
[58] Field of Search ...................... 360/85; 242/76; 226/196, 190, 199

[56] References Cited

U.S. PATENT DOCUMENTS 4,561,029  12/1985  Maeda ........................ 360/85
5,113,296   5/1992  Kaneko et al. ............... 360/85
5,124,862   6/1992  Sawano et al. ............... 360/85

FOREIGN PATENT DOCUMENTS

2904983  8/1979  Fed. Rep. of Germany ........ 360/85

Primary Examiner—John T. Kwon
Attorney, Agent, or Firm—Lewis H. Eslinger; Jay H. Maioli

[57] ABSTRACT

A tape loading device capable of obtaining sufficient information in a region of a tape necessary for recording and reproduction. The tape loading device being provided with two guide assemblies (38) and (47) for wrapping a magnetic tape (6) drawn from a supply reel and a take-up reel, respectively, around an outer circumferential surface of a head drum (1). The guide assemblies (38) and (47) respectively including sliders (39) and (48) movable between a tape loading start position and a tape loading end position, and holders (40) and (49) rotatably supported on the sliders (39) and (48) for respectively holding inclined guides (40a) and (49a). Rotational centers ($O_1$) and ($O_2$) of the holders (40) and (49) being positioned so that a distance (S) between the inclined guide (40a) and the outer circumferential surface of the head drum (1) and a distance (T) between the inclined guide (49a) and the outer circumferential surface of the head drum (1) can be varied by rotation of the holders (40) and (49). With this construction, a wrapping quantity of the magnetic tape (6) wrapped around the outer circumferential surface of the head drum (1) at the tape loading end position can be adjusted by varying the distances (S) and (T).

7 Claims, 9 Drawing Sheets

TAPE LOADING DEVICE

BACKGROUND OF THE INVENTION

The present invention relates to a tape loading device to be suitably used in a magnetic recording/reproducing apparatus such as a video tape recorder.

In recent years, a magnetic recording/reproducing apparatus such as a video tape recorder (which will be hereinafter referred to as "VTR") has been remarkably spread, and a VTR has accordingly become familiar.

Figure 8:
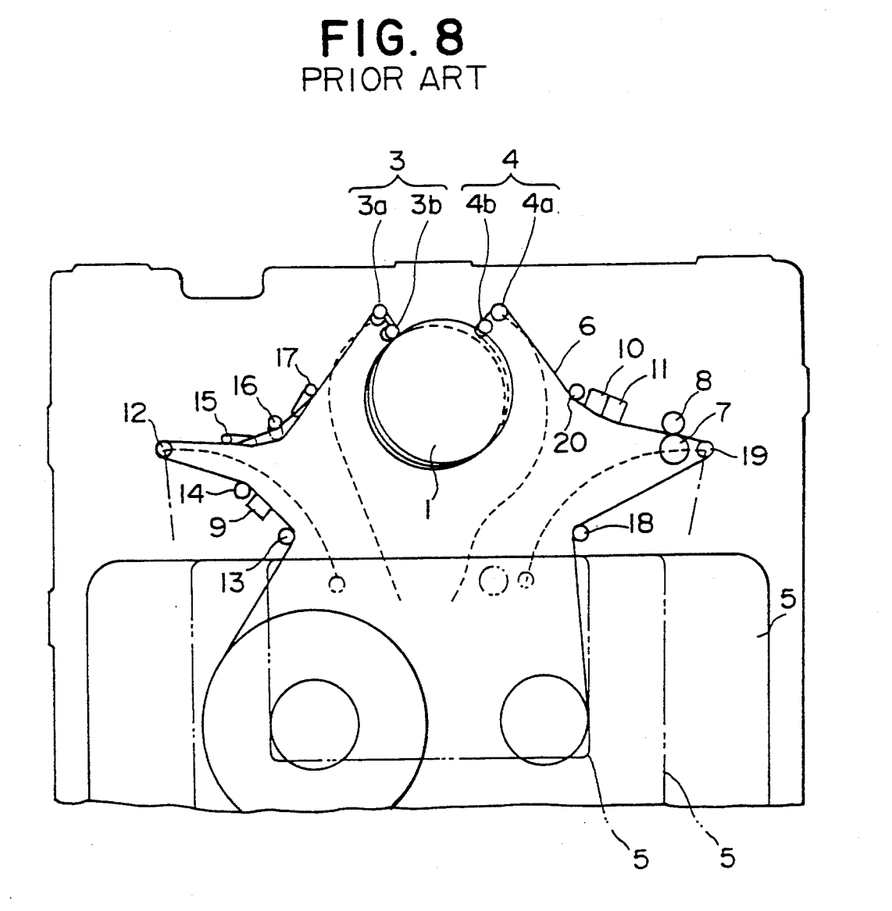
FIG. 8 is a plan view illustrating a tape travelling system in a tape loading device in the prior art.
Figure 9:
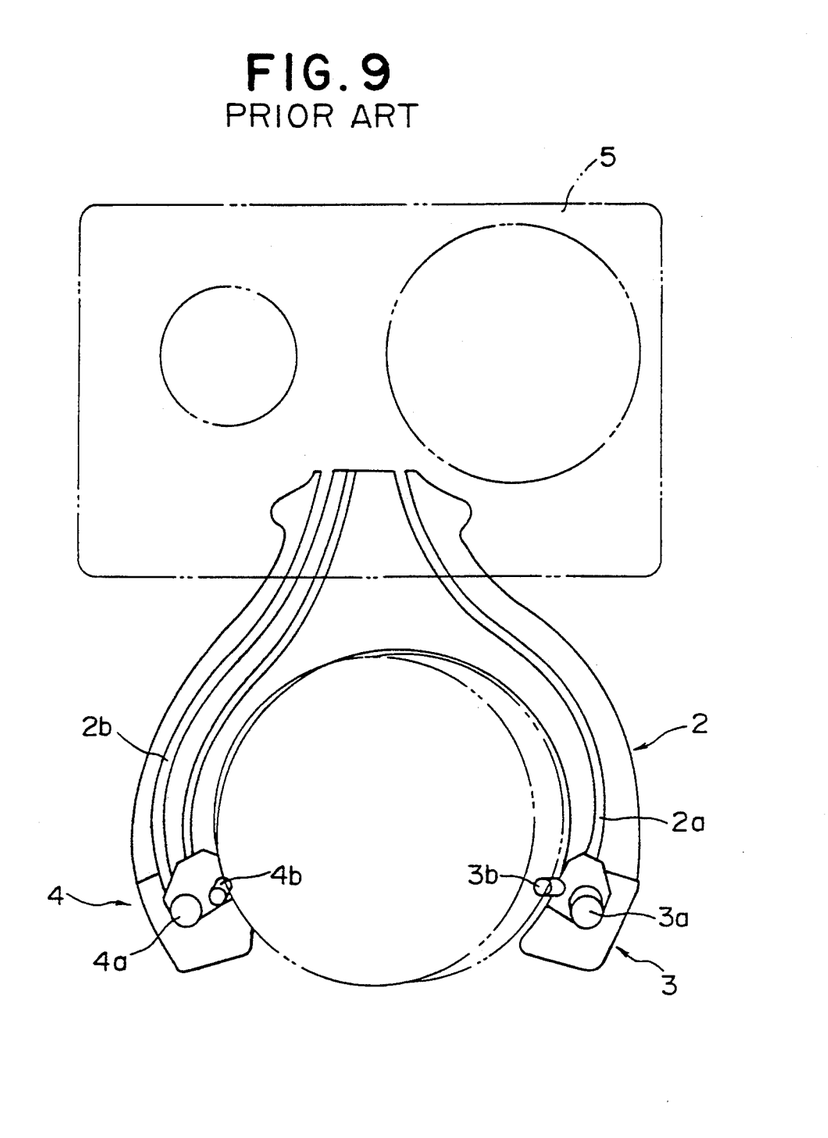
FIG. 9 is a plan view of a rail in the prior art tape loading device.

In such a magnetic recording/reproducing apparatus, there is provided a known tape loading device as shown in FIGS. 8 and 9 by way of example. A schematic construction of the tape loading device as illustrated will now be described. Referring to FIGS. 8 and 9, reference numeral 1 designates a head drum having two upper and lower drum members (not shown) and a rotary head chip (not shown) provided between the upper and lower drum members so as to project in a radial direction of the head drum 1. A rail 2 is provided so as to surround the head drum 1, and it has two guide slots 2a and 2b extending along the outer circumferential surface of the head drum 1. Two guide assemblies 3 and 4 are movably mounted on the rail 2 so as to be guided by the two guide slots 2a and 2b, respectively. The guide assembly 3 on the supply side has a roller guide 3a and an inclined guide 3b for drawing a magnetic tape 6 accommodated in a tape cassette 5 and wrapping the magnetic tape 6 around the outer circumferential surface of the head drum 1. Similarly, the guide assembly 4 on the take-up side has a roller guide 4a and an inclined guide 4b for drawing the magnetic tape 6 accommodated in the tape cassette 5 and wrapping the magnetic tape 6 around the outer circumferential surface of the head drum 1.

Referring to FIG. 8, a tape travelling system in the magnetic recording/reproducing apparatus includes a pinch roller 7, capstan 8, full erasing head 9, channel erasing head 10, recording/reproducing fixed head 11, tape guide 12 as a tension regulator, tape guides 13 to 17 on the supply side, and tape guides 18 to 20 on the take-up side.

In the tape loading device as constructed above, a loading operation of the magnetic tape 6 is performed by moving the guide assemblies 3 and 4 along the guide slots 2a and 2b, respectively. That is, the guide assembly 3 on the supply side and the guide assembly 4 on the take-up side are moved in opposite directions with respect to the head drum 1, thereby drawing the magnetic tape 6 out of the tape cassette 5 and spirally wrapping the magnetic tape 6 around the outer circumferential surface of the head drum 1.

Figure 10:
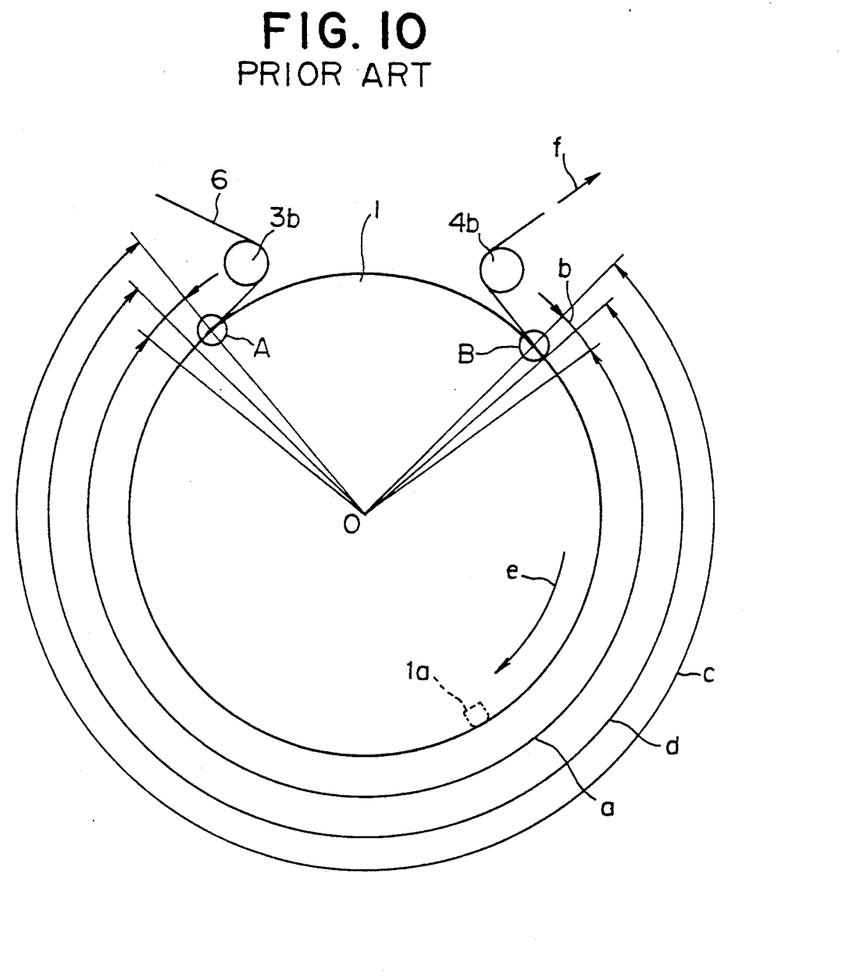
FIG. 10 is a schematic plan view illustrating a wrapped condition of a magnetic tape in the prior art tape loading device.

In such a tape loading device, as shown in FIG. 10, a wrapping quantity of the magnetic tape 6 around the outer circumferential surface of the head drum 1 is normally set to a sufficient wrapping quantity c obtained by adding an overwrapping quantity b to a wrapping quantity a necessary for recording and reproduction. In FIG. 10, reference character d denotes a wrapping quantity suppressing the occurrence of bouncing of a signal waveform, and reference numerals e and f denote a rotational direction of a head chip 1a and a travelling direction of the magnetic tape 6 in recording and reproduction respectively. Further, reference character O denotes the center of the head drum 1.

Figure 11:
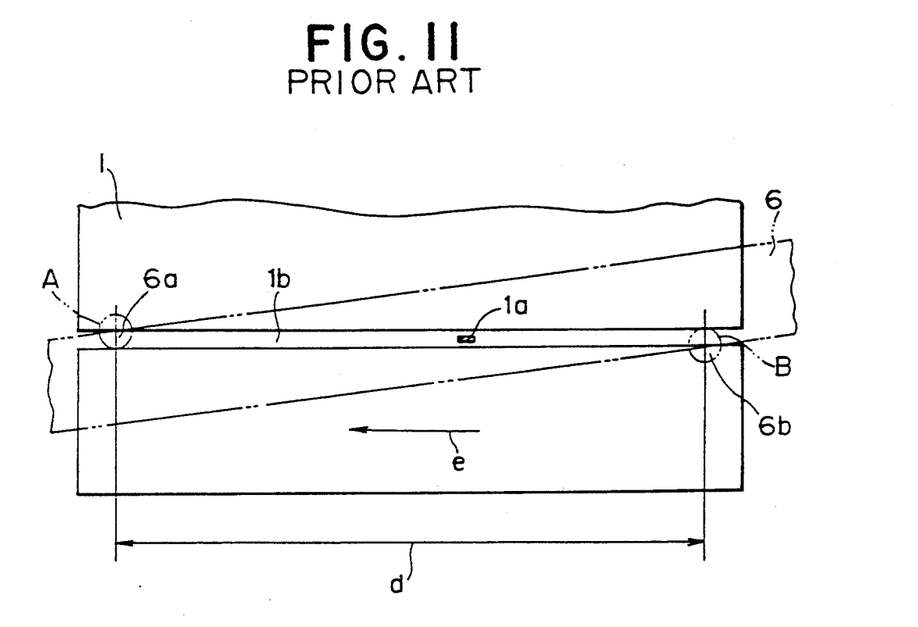
FIG. 11 is a side view illustrating a defective wrapped condition of the magnetic tape in the prior art tape loading device.
Figure 12:
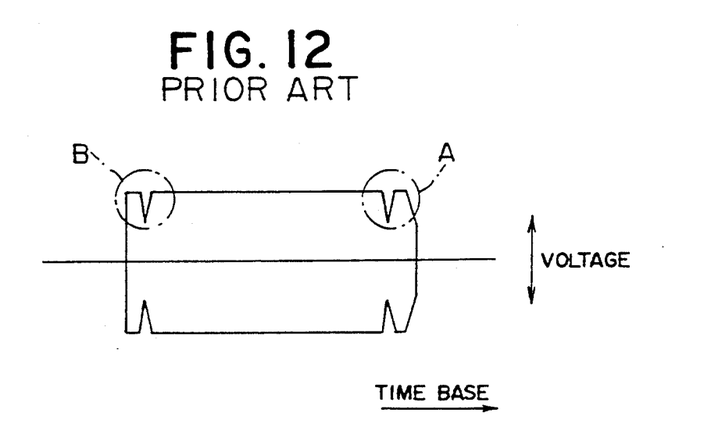
FIG. 12 is a waveform chart in reproducing the magnetic tape in FIG. 11.

However, the prior art tape loading device does not have a function of adjusting a wrapping quantity of the magnetic tape 6 around the outer circumferential surface of the head drum 1. Accordingly, even when the magnetic tape 6 is overwrapped with the quantity c around the outer circumferential surface of the head drum 1, there occurs a problem such that as shown in FIG. 11, an upper edge 6a and a lower edge 6b of the magnetic tape 6 at opposite wrapping end portions A and B shown in FIG. 10 enter a circumferential groove 1b of the head drum 1 or approach the same as close as possible, owing to the structure of the head drum 1, causing a reduction in contact pressure of the magnetic tape 6 against the head drum 1 at the portions A and B under the influence of an air flow generated during rotation of the rotary head chip 1a. As a result, referring to FIG. 12, there occurs bouncing of a signal waveform at starting or ending of contact of the head chip 1a with the magnetic tape 6 at the portions A and B, so that sufficient information cannot be obtained in a region necessary for recording and reproduction.

SUMMARY OF THE INVENTION

It is accordingly an object of the present invention to provide a tape loading device which can prevent the occurrence of bouncing of a signal waveform at starting or ending of contact of a head chip with a magnetic tape, thereby obtaining sufficient information in a region necessary for recording and reproduction.

According to the present invention, there is provided in a tape loading device having two guide assemblies for wrapping a magnetic tape drawn from a supply reel and a take-up reel, respectively, around an outer circumferential surface of a head drum; the improvement wherein each of the guide assemblies comprises a slider adapted to be moved between a tape loading start position and a tape loading end position and a holder rotatably supported on the slider for holding a tape guide, and a rotational center of the holder is positioned so that a distance between the tape guide and the head drum can be varied by rotation of the holder.

With this construction, a wrapping quantity of the magnetic tape wrapped around the outer circumferential surface of the head drum at the tape loading end position can be adjusted by varying the distance between the tape guide on the supply reel side and the outer circumferential surface of the head drum and the distance between the tape guide on the take-up reel side and the outer circumferential surface of the head drum.

Accordingly, in wrapping the magnetic tape around the head drum, a contact pressure of the magnetic tape against the head drum is not reduced, thereby preventing the occurrence of bouncing of a signal waveform at starting or ending of contact of the head chip with the magnetic tape. As a result, sufficient information can be obtained in a region necessary for recording and reproduction.

Other objects and features of the invention will be more fully understood from the following detailed description and appended claims when taken with the accompanying drawings.

DETAILED DESCRIPTION OF THE PREFERRED EMBODIMENTS

There will now be described a preferred embodiment of the present invention with reference to the drawings, in which the same reference numerals as those shown in FIGS. 8 to 11 designate the same or corresponding parts.

Referring to FIGS. 1A to 2B, reference numeral 31 designates a rail having a main rail 32 and a pair of subrail blocks 33a and 33b. The rail 31 is so provided as to surround a head drum 1, and is formed with a pair of guide slots 34a and 34b opening to the upper and lower sides. The subrail blocks 33a and 33b of the rail 31 are positioned at a level just lower than that of the main rail 32. A pair of rail plates 35 and 36 are fixed to the front ends of the subrail blocks 33a and 33b, respectively. The rail plates 35 and 36 are respectively formed with a pair of recesses 35a and 36a each having a V-shaped configuration as viewed in plan. A sliding surface of a slider 39 (to be hereinafter described) on the subrail block 33a side with respect to the rail 31 is positioned in the same level as that of a slider 48 (to be hereinafter described) on the subrail block 33b side with respect to the rail 31. Further, a portion of the rail 31 on the take-up side is formed with a pin guiding groove 37 opening to the upper side.

Figure 1A:
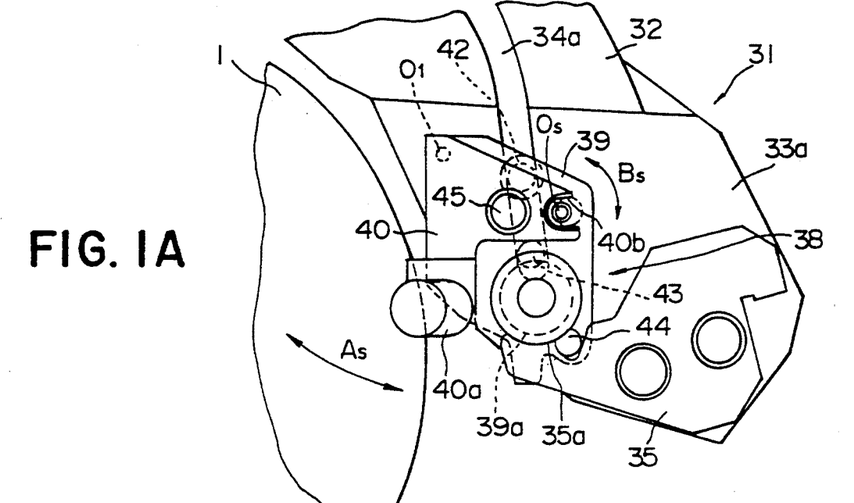
FIG. 1A is a plan view of a guide assembly on the supply side in a tape loading device according to the present invention.
Figure 1B:
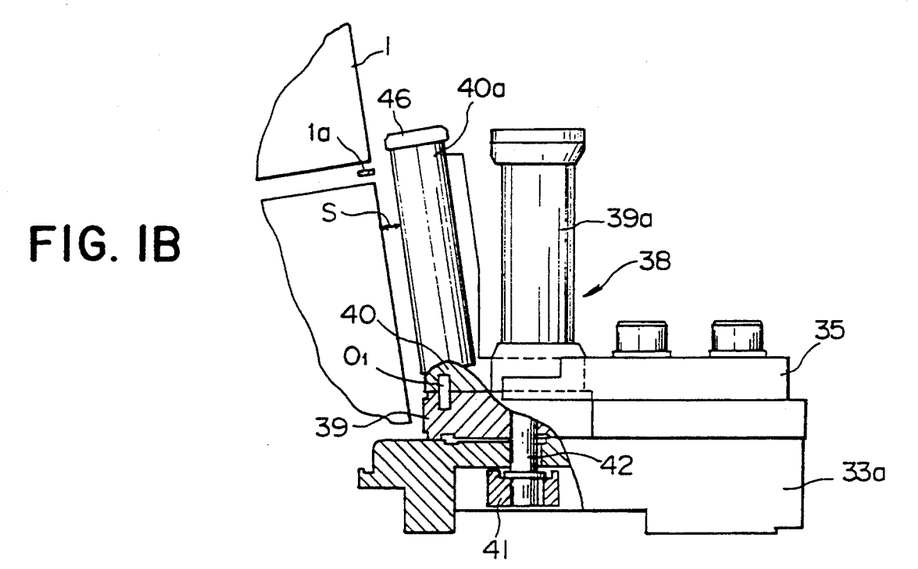
FIG. 1B is an elevational view, partially in section, of the guide assembly shown in FIG. 1A.

Referring to FIGS. 1A and 1B, reference numeral 38 designates a guide assembly on the supply side for wrapping a magnetic tape 6 drawn from a supply reel (not shown) around the outer circumferential surface of the head drum 1. The guide assembly 38 is comprised of a slider 39 having a roller guide 39a and opposed to a peripheral portion of the upper opening of the guide slot 34a, and a holder 40 rotatably supported to the slider 39 for holding an inclined guide 40a as a drum inlet guide. The guide assembly 38 is constructed so as to be moved between a tape loading start position and a tape loading end position.

A slider block 41 is disposed so as to be opposed to a peripheral portion of the lower opening of the guide slot 34a. The slider block 41 is connected through a first positioning pin 42 to the slider 39 of the guide assembly 38. Further, the slider 39 is provided with a leading pin 43 exposed to the guide slot 34a and a second positioning pin 44 engageable with the recess 35a of the rail plate 35.

The holder 40 of the guide assembly 38 is formed at a side edge thereof with a U-shaped recess 40b adapted to receive a tool for rotating the holder 40 which will be hereinafter described. A rotational center $O_1$ (pin) of the holder 40 is positioned so that a distance S between the inclined guide 40a and the head drum 1 can be varied by rotation of the holder 40.

Reference numeral 45 designates a screw for fixing the holder 40 to the slider 39.

Reference numeral 46 designates a cap-shaped protector fixed to the upper end surface of the inclined guide 40a. The protector 46 has a diameter just larger than that of the inclined guide 40a, so as to prevent the inclined guide 40a from abutting against the head drum 1. The protector 46 is made of a resin material such as nylon or polyacetal.

Figure 2A:
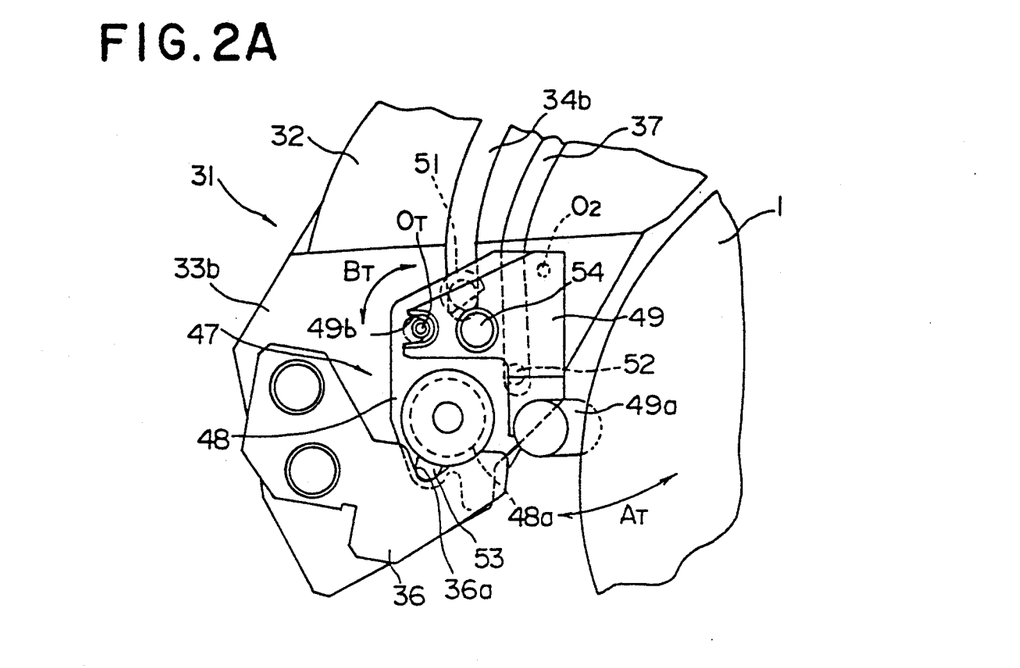
FIG. 2A is a plan view of a guide assembly on the take-up side in the tape loading device.
Figure 2B:
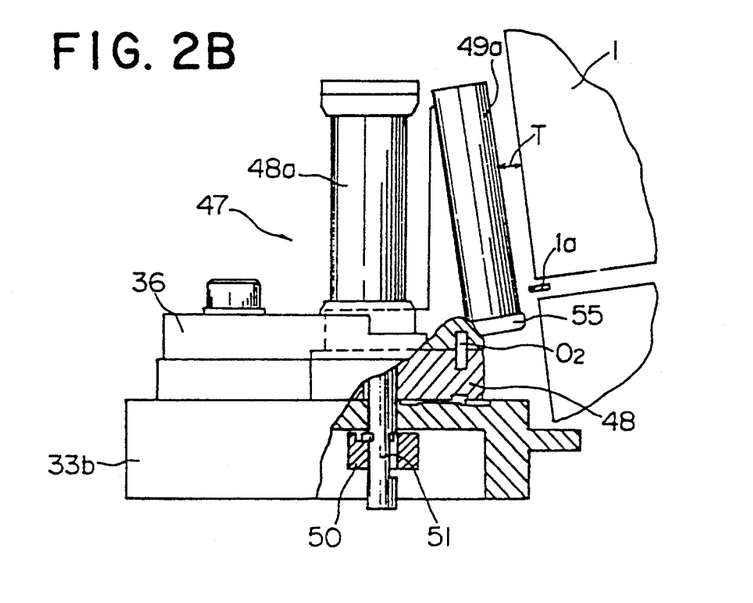
FIG. 2B is an elevational view, partially in section, of the guide assembly shown in FIG. 2A.

Referring to FIGS. 2A and 2B, reference numeral 47 designates a guide assembly on the take-up side for wrapping the magnetic tape 6 drawn from a take-up reel (not shown) around the outer circumferential surface of the head drum 1. The guide assembly 47 is comprised of a slider 48 having a roller guide 48a and opposed to a peripheral portion of the upper opening of the guide slot 34b, and a holder 49 rotatably supported to the slider 48 for holding an inclined guide 49a as a drum outlet guide. The guide assembly 47 is constructed so as to be moved between the tape loading start position and the tape loading end position.

A slider block 50 is disposed so as to be opposed to a peripheral portion of the lower opening of the guide slot 34b. The slider block 50 is connected through a first positioning pin 51 to the slider 48 of the guide assembly 47. Further, the slider 48 is provided with a guide pin 52 exposed to the groove 37 and a second positioning pin 53 engageable with the recess 36a of the rail plate 36.

The holder 49 of the guide assembly 47 is formed at a side edge thereof with a U-shaped recess 49b adapted to receive a tool for rotating the holder 49, which tool may be identical with the tool for rotating the holder 40 mentioned above. A rotational center $O_2$ (pin) of the holder 49 is positioned so that a distance T between the inclined guide 49a and the head drum 1 can be varied by rotation of the holder 49.

Reference numeral 54 designates a screw for fixing the holder 49 to the slider 48.

Reference numeral 55 designates a cap-shaped protector fixed to the lower end surface of the inclined guide 49a. The protector 55 has a diameter just larger than that of the inclined guide 49a, so as to prevent the inclined guide 49a from abutting against the head drum 1. The protector 55 is made of a resin material such as nylon or polyacetal.

Figure 3A:
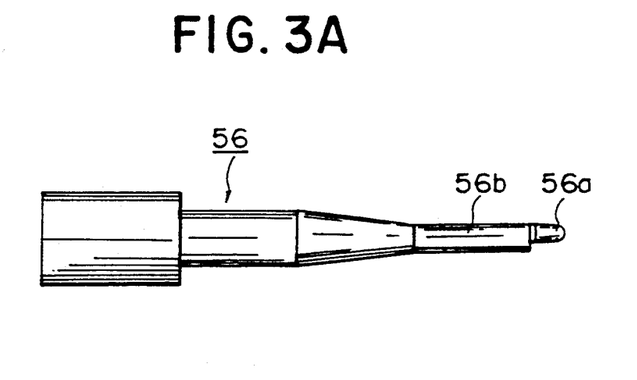
FIG. 3A is a side view of a tool to be used for adjustment of a drum wrapping angle in the tape loading device.
Figure 3B:
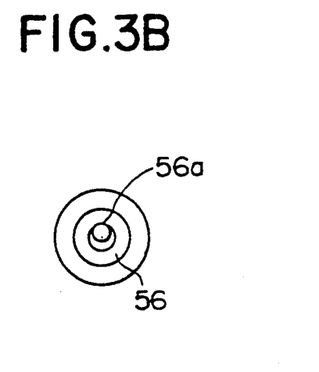
FIG. 3B is a front elevational view of the tool shown in FIG. 3A.

Referring to FIGS. 3A and 3B, reference numeral 56 designates a tool for rotating the holders 40 and 49 to adjust a wrapping quantity of the magnetic tape 6 wrapped around the outer circumferential surface of the head drum 1 at the tape loading end position. The tool 56 is constructed generally as a circular rod member having a tapering head portion 56a and a barrel portion 56b larger in diameter than the tapering head portion 56a. The tapering head portion 56a is eccentric from the barrel portion 56b.

In FIGS. 1A and 2A, arrows $A_S$ and $A_T$ depict rotating directions of the holders 40 and 49, respectively, and arrows $B_S$ and $B_T$ depict adjusting directions of the tool 56 in rotating the holders 40 and 49, respectively.

In the tape loading device as constructed above, the wrapping quantity of the magnetic tape 6 wrapped around the outer circumferential surface of the head drum 1 at the tape loading end position can be adjusted by varying the distance S between the inclined guide 40a on the supply side and the outer circumferential surface of the head drum 1 and also varying the distance T between the inclined guide 49a on the tape-up side and the outer circumferential surface of the head drum 1.

Accordingly, in wrapping the magnetic tape 6 around the head drum 1, a contact pressure of the magnetic tape 6 against the head drum 1 does not decrease to thereby prevent the occurrence of bouncing of a signal waveform at starting or ending of contact of a head chip 1a with the magnetic tape 6.

Figure 4A:
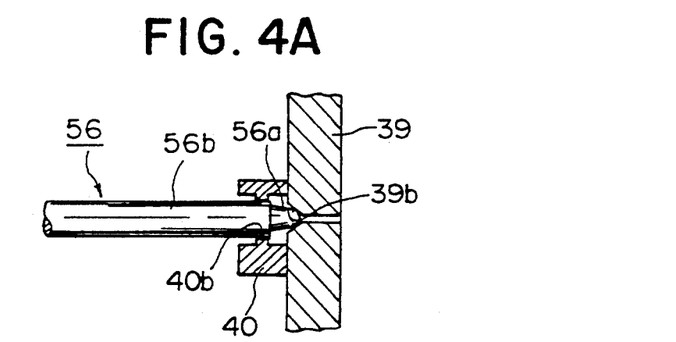
FIGS. 4A and 4B are sectional views illustrating the operation of the tool shown in FIGS. 3A and 3B.
Figure 4B:
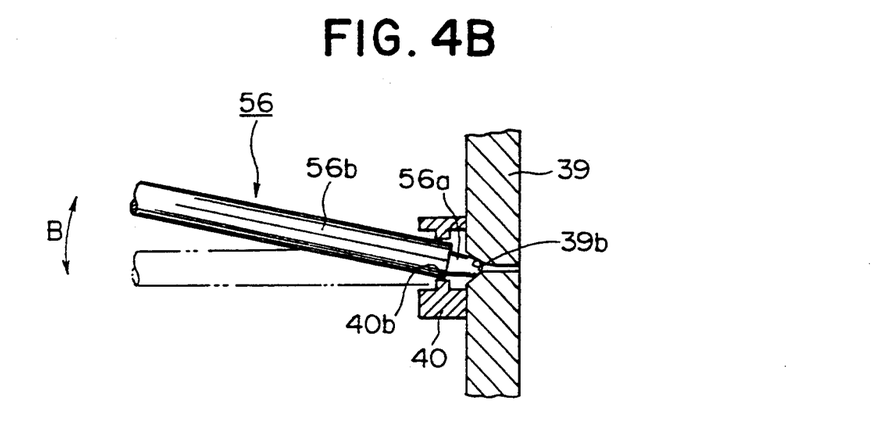
Figure 5A:
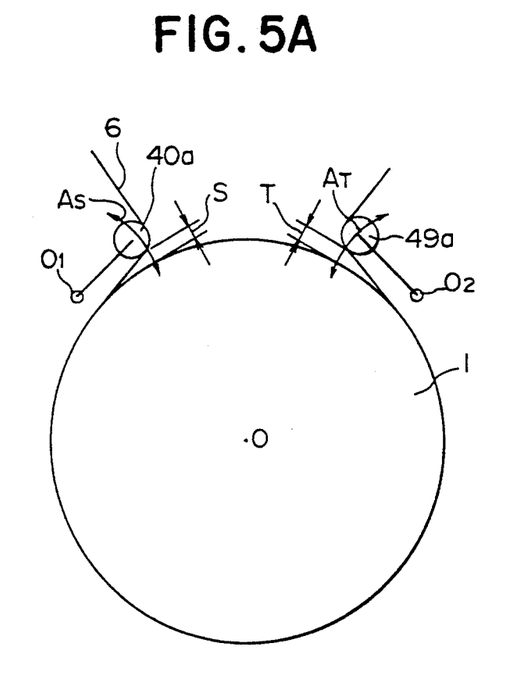
FIGS. 5A and 5B are schematic plan views illustrating an adjusting method for the drum wrapping angle.

The distance S between the inclined guide 40a and the outer circumferential surface of the head drum 1 is varied in the following manner. First, the screw 45 is loosened. Then, as shown in FIG. 4A, the barrel portion 56b of the tool 56 is received into the U-shaped recess 40b of the holder 40, and the tapering head portion 56a of the tool 56 is engaged into a V-shaped groove 39b of the slider 39. Then, as shown in FIG. 4B, the tool 56 is swung in a direction of arrow B, or it is twisted about a fulcrum $O_S$ in the adjusting direction $B_S$ as shown in FIG. 1A. As a result, the holder 40 is rotated about the pin $O_1$ in the direction $A_S$ as shown in FIG. 5A, thereby varying the distance S.

The distance T between the inclined guide 49a and the outer circumferential surface of the head drum 1 is varied in the same manner as the above. That is, after the screw 54 is loosened, the barrel portion 56b of the tool 56 is received into the U-shaped recess 49b of the holder 49, and the tapering head portion 56a of the tool 56 is engaged into a V-shaped groove (not shown) of the slider 48. Then, the tool 56 is swung in the direction B as shown in FIG. 4B, or it is twisted about a fulcrum $O_T$ in the adjusting direction $B_T$ as shown in FIG. 2A. As a result, the holder 49 is rotated about the pin $O_2$ in the direction $A_T$ as shown in FIG. 5A, thereby varying the distance T.

Figure 5B:
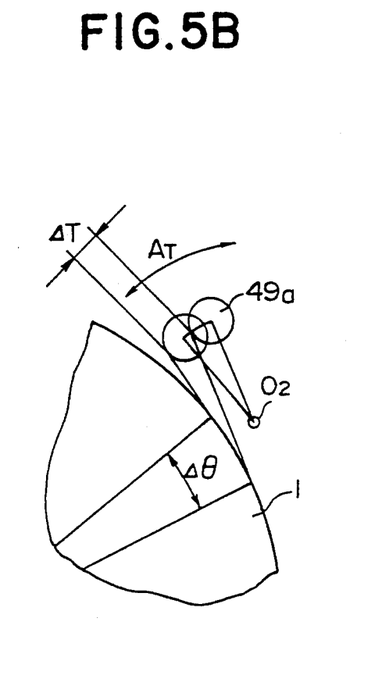

Referring to FIG. 5B, $\Delta T$ depicts a change in the distance T to be obtained by the rotation of the holder 49, and $\Delta \theta$ depicts a change in the drum wrapping angle.

Figure 6:
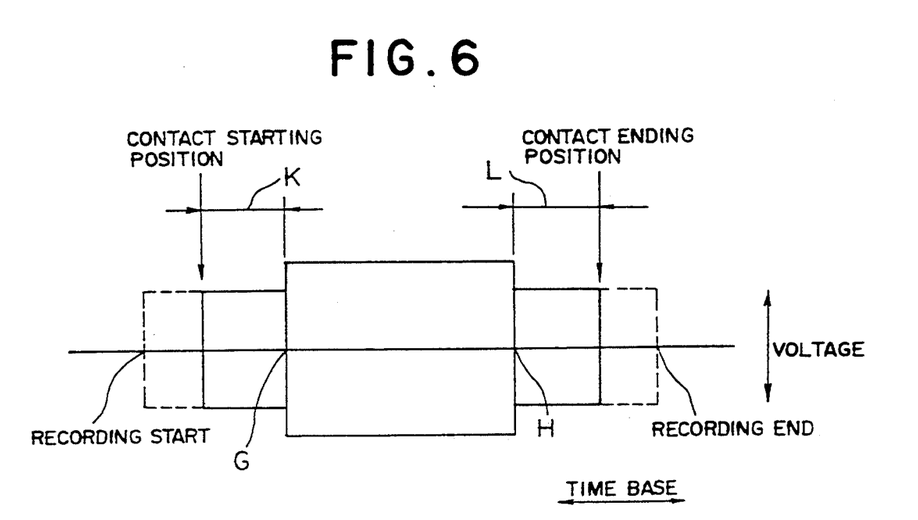
FIG. 6 is a waveform chart in reproducing a reference tape to be used for adjustment of the drum wrapping angle.

The adjustment of the drum wrapping angle is carried out as the magnetic tape 6 travels in a play mode after the end of tape loading. In this case, a reference tape capable of providing a signal waveform as shown in FIG. 6 is used. That is, in reproducing the reference tape and observing a reproduced signal waveform on an oscilloscope or the like, a reference point G and a reference point H can be clearly recognized in the direction of time base. In this case, a contact starting position and a contact ending position change in the direction of time base in adjusting the drum wrapping angle during travelling of the reference tape, so that the adjustment is carried out so as to satisfy a standard K (x μsec) and a standard L (y μsec). Further, after ending the adjustment, an adjusted condition may be checked by recording a pattern and measuring a geometrical dimension of the tape pattern developed.

Figure 7A:
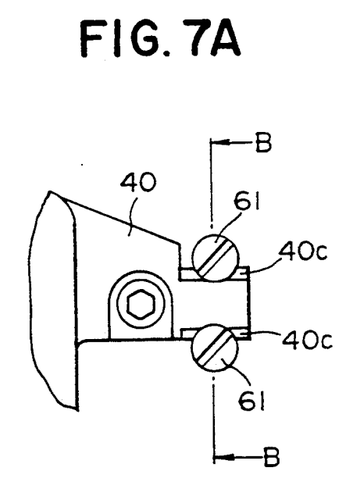
FIG. 7A is a plan view illustrating another preferred embodiment of the adjusting method for the drum wrapping angle.
Figure 7B:
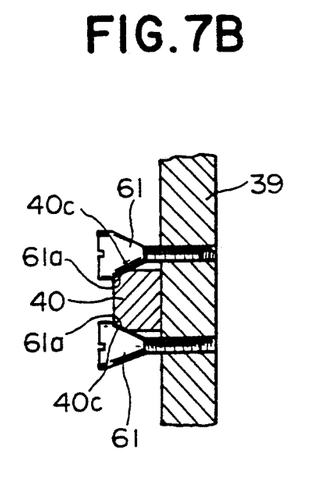
FIG. 7B is a cross section taken along the line B—B in FIG. 7A.

While the drum wrapping angle is adjusted by using the tool 56 in the above preferred embodiment, this method is merely illustrative, and the present invention is not limited to the above preferred embodiment. For instance, the drum wrapping angle may be adjusted by using tapering screws 61 as shown in FIGS. 7A and 7B. Referring to FIGS. 7A and 7B, two tapering screws 61 each having a tapering surface 61a are threadedly engaged with each of the sliders 39 and 48 (the slider 39 only shown), and the holders 40 and 49 (the holder 40 only shown) are respectively formed with tapering surfaces 40c and 49c (tapering surfaces 40c only shown) contacting the tapering surfaces 61a of the tapering screws 61. Also in this case, the adjustment of the drum wrapping angle may be carried out by using a reference tape as mentioned above, and an adjusted condition may be checked with a recorded pattern.

Further, although the tape loading device of the present invention is applied to a VTR in the above preferred embodiment, the application of the present invention is not limited to the VTR, but it may be similarly applied to various magnetic recording/reproducing devices and information processing devices.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A tape loading device for loading a magnetic tape on a head drum, including a movable tape guide assembly for wrapping said magnetic tape between a supply side of said head drum and an opposite take-up side of said head drum around an outer circumferential surface thereof, said movable tape guide assembly comprising:

first tape guide means for guiding said magnetic tape to be wrapped around said outer circumferential surface of said head drum;

holder means supporting said first tape guide means and having a contact portion;

slider means rotatably supporting said holder means and mounted for translation between a tape loading start position and a tape loading end position, said means including a receiving portion;

means for rotatably mounting said holder means on said slider means so that a distance between said first tape guide means and said outer circumferential surface of said head drum is variable; and means for adjusting a wrapping angle of said magnetic tape with respect to said head drum by rotating said holder means relative to said slider means, wherein said means for adjusting comprises a rod member having a tapering head portion and a barrel portion larger in diameter than said tapering head portion, in which said receiving portion formed on said slider means receives said tapering head portion of said rod member, and said contact portion formed on said holder means contacts said barrel portion of said rod member to be force said holder means to rotate thereby.

2. The tape loading device as defined in claim 1, wherein said tapering head portion is eccentric from said barrel portion.

3. The movable tape guide assembly as defined in claim 1 further comprising second tape guide means for receiving said magnetic tape restricted in said wrapping angle by said first tape guide means and guiding said magnetic tape so as to prevent a travelling direction of said magnetic tape from being influenced by restriction of said wrapping angle.

4. The movable tape guide assembly as defined in claim 1 further comprising cap-shaped protector means mounted on an end of said first tape guide means for preventing said first tape guide means from abutting against said head drum, said protector means having a diameter larger than a diameter of said first tape guide means.

5. A tape loading device for loading a magnetic tape on a head drum, including a movable tape guide assembly for wrapping said magnetic tape between a supply side of said head drum and an opposite take-up side of said head drum around an outer circumferential surface thereof, said movable tape guide assembly comprising:

first tape guide means for guiding said magnetic tape to be wrapped around said outer circumferential surface of said head drum;

holder means supporting said first tape guide means;

slider means rotatably supporting said holder means and mounted for translation between a tape loading start position and a tape loading end position;

means for rotatably mounting said holder means on said slider means so that a distance between said first tape guide means and said outer circumferential surface of said head drum is variable; and adjusting means for adjusting a wrapping angle of said magnetic tape with respect to said head drum by rotating said holder means relative to said slider means, wherein said adjusting means comprises a tapering screw threadedly engaged with said slider means and a tapering portion formed on said holder means for contacting a tapering portion of said tapering screw to be forced into rotation thereby.

6. The tape loading device as defined in claim 5 further comprising second tape guide means for receiving said magnetic tape restricted in said wrapping angle by said first tape guide means and guiding said magnetic tape so as to prevent a travelling direction of said magnetic tape from being influenced by restriction of said wrapping angle.

7. The tape loading device as defined in claim 5 further comprising cap-shaped protector means mounted on an end of said first tape guide means for preventing said first tape guide means from abutting said head drum, said protector means having a diameter larger than a diameter of said first tape guide means.

* * * * *